J. F. & H. E. DODGE.
GEAR SHIFT DEVICE.
APPLICATION FILED FEB. 2, 1915.
1,163,648.
Patented Dec. 14, 1915.
2 SHEETS—SHEET 1.
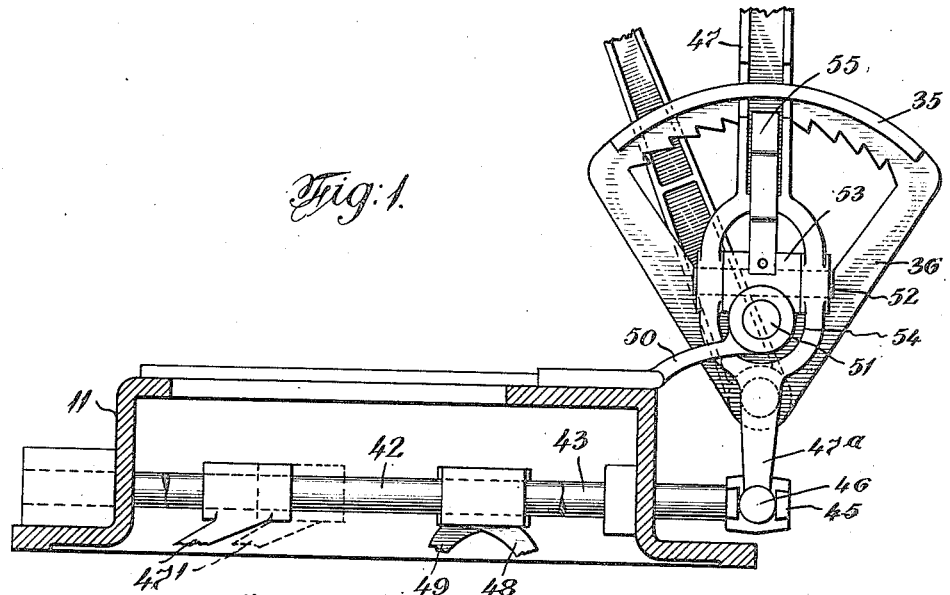
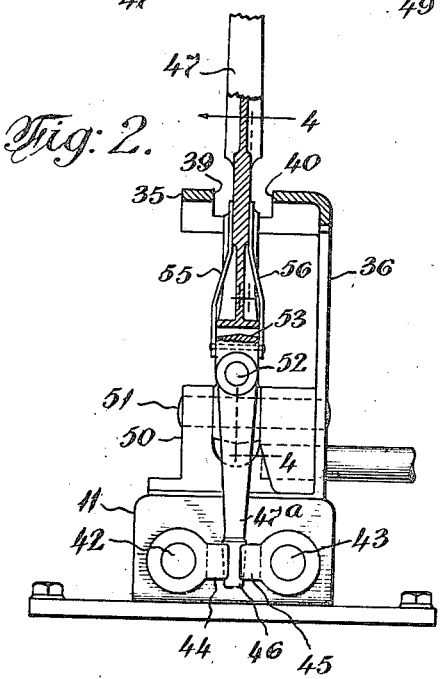
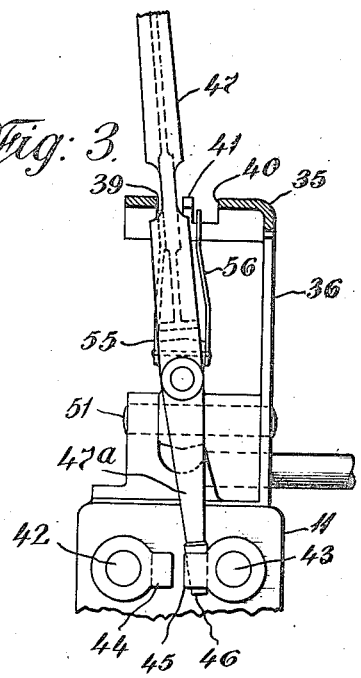
Witnesses:
John J. Kittel
A. Bernstein
Inventors
John F. Dodge
Horace E. Dodge
By their Attorneys J. F. & H. E. DODGE.
GEAR SHIFT DEVICE.
APPLICATION FILED FEB. 2, 1915.
1,163,648.
Patented Dec. 14, 1915.
2 SHEETS—SHEET 2.
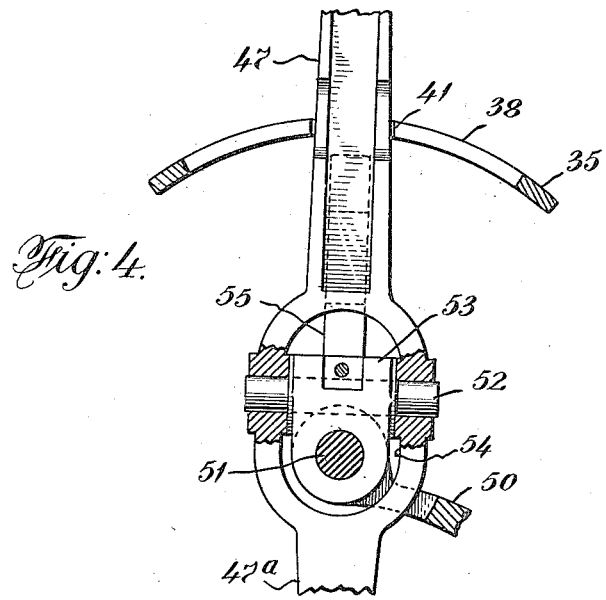
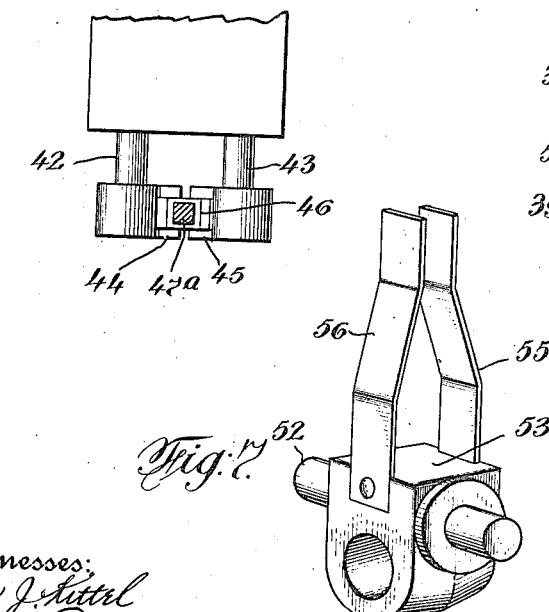
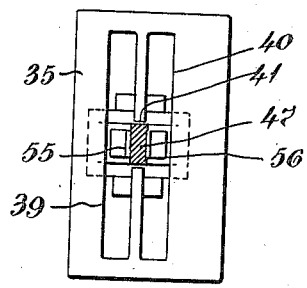
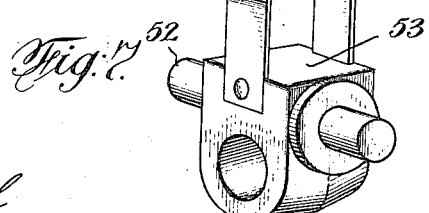
Inventors
John F. Dodge
Horace E. Dodge

UNITED STATES PATENT OFFICE.

JOHN F. DODGE AND HORACE E. DODGE, OF DETROIT, MICHIGAN, ASSIGNORS TO DODGE BROTHERS, OF DETROIT, MICHIGAN, A CORPORATION OF MICHIGAN.

GEAR-SHIFT DEVICE.

1,163,648.  Specification of Letters Patent.  Patented Dec. 14, 1915.

Original application filed August 19, 1914, Serial No. 857,483. Divided and this application filed February 2, 1915. Serial No. 5,613.

*To all whom it may concern:*

Be it known that we, JOHN F. DODGE and HORACE E. DODGE, citizens of the United States, residing at Detroit, Michigan, have invented certain new and useful Improvements in Gear-Shift Devices, of which the following is a clear, full, and exact description.

This invention relates to gear shift devices such as are used for shifting the gears of transmission gear mechanism, such as employed in automobiles, and the present application is a division and continuation of our former application filed August 19, 1914, Serial No. 857,483.

One of the objects of the present invention is to provide improved means for mounting the controlling lever in such a way that the space in which the lever has to move in order to shift it from one side of the quadrant or H-plate to the other is reduced, and so that the greatest leverage is given where the force required is the greatest, that is, in the shifting of the gears. Other objects of the invention are to provide a simple, practical and efficient gear shifting device.

These being among the objects of the present invention, the same consists of certain features of construction and combinations of parts to be hereinafter described and then claimed with reference to the accompanying drawings illustrating a suitable embodiment of the invention, in which—

Figure 1 is a longitudinal section of a gear case cover and concomitant parts, including a side elevation of gear shifting means associated therewith; Figs. 2 and 3 respectively are side elevations partly in section of the gear shifting device, Fig. 2 showing the controlling lever in neutral or normal position, and Fig. 3 showing the same shifted; Fig. 4 is an enlarged vertical section partly broken away on the line 4—4 Fig. 2; Fig. 5 is a detail plan partly in section, showing the devices mounted in the gear case cover, and a part of the controlling lever; Fig. 6 is a plan of the quadrant or H-plate for the controlling lever, showing the latter in section; and Fig. 7 is a detail perspective view of an improved link device employed herein.

The control mechanism or gear shift device is preferably of the type in which a quadrant or guide-plate provided with an H-slot or its equivalent is used. Referring to Figs. 1, 2 and 3, the guide-plate or quadrant 35 is mounted on a suitable supporting frame 36, which is carried by a bracket 50. The control lever 47—47ª extends upwardly through an H slot 38 in plate 35, in the form of the invention shown, which slot is provided with parallel ways 39 and 40 and with a transverse or connecting way 41, Fig. 6.

The gear case cover or casing 11 is provided with suitable bearings for longitudinally movable rods 42 and 43, one rod having a recessed lug 44 and the other a recessed lug 45, at corresponding ends of said rods. The lower end 46 of an extension 47ª of the controlling lever is by means of the mounting for said lever located in position so that it may coöperate with said recessed lugs, that is to say, it may be moved into engagement with the recess of lug 44 or with the recess of lug 45, as shown in Fig. 5. The slide rod 42 carries arms 47' and 48 which are adapted at their free ends to engage in the grooved hubs of certain change gears, while an arm 49 on the other slide rod 43 engages at its free end with the grooved hub of another change gear. The said controlling lever 47 is preferably carried on two pivots 51 and 52, the pivot 52 being located above the pivot 51 and being positioned so that said pivots extend transversely of each other. The pivot 51 connects a block or link 53 Fig. 4, with the bracket 50, said block or link being positioned within an opening 54 in the lever. Pivot 52 is carried by said block or link 53 and the control lever is pivoted thereon with its handle portion 47 and its extension 47ª extending in opposite directions from said pivot. As shown more clearly in Fig. 7, said block or link 53 carries flat springs or spring fingers 55, 56, at opposite ends, the same being so positioned that their free ends will have spring contact with the opposite sides of the handle 47 of the control lever, or those sides of the lever which correspond with the opposite sides of the pivot pin 52. This being the case, it will be seen that when the springs are properly mounted and set, they will have a tendency to move the controlling lever to absolutely neutral position shown in Fig. 2, so that that portion of the lever which passes through the H slot will be set midway between the ends of the connecting way of said slot. By moving the lever to one side or the other of the H slot so as to pass into one of the parallel ways, the said lever will be swung upon the pivot 52, and as the block or link 53 cannot swing in that direction, one of the springs will be placed under tension. If in this position the said lever be released, it will be automatically returned to central position between the ends of the connecting way by the action of the deflected spring. As shown in Fig. 3, the other spring will not be deflected unless the lever is moved against it, in its direction. It will be noted that by reason of the location and action of the said springs 55 and 56, the ends thereof do not protrude through the guide-plate and consequently the clothing of a person cannot catch on the ends of said springs.

The double pivot arrangement described is advantageous in that by locating the transverse pivot 52 over the longitudinal pivot 51, the space in which one will have to move the lever in order to shift from one side of the quadrant to the other is reduced, and it gives the greatest leverage where the force required is the greatest; namely in shifting the gears.

The method of shifting the lever for the purpose of obtaining three different speeds will be obvious, as well as for obtaining the reverse rotation of the driven-shaft, but when the said lever is moved toward one end of one of the parallel ways it is shifted upon its pivot 51 and the gear mechanism is thereby conditioned for the appropriate speed, or the reverse. If, however, the machine is to be stopped, the lever is moved back toward the transverse connecting way 41 of the H slot. Should a careless operator leave the lever in position at one end of said slot, it might be accidentally shifted if it were not for the fact that when the lever is so positioned it is automatically returned to central neutral position between the ends of said connecting way.

It is obvious that the invention is susceptible of modification, as parts may be omitted, parts added, and parts substituted without departing from the spirit and scope thereof as expressed in the claims.

What we claim as new is:—

1. In a gear shift device, the combination of a controlling lever, means for automatically moving said lever in two directions to the common center of its different speed positions, said lever being movable at an angle to said two directions, and means connecting said lever and said automatic means whereby the latter may be shifted as a whole in said angular direction.

2. In a gear shift device, the combination of a controlling lever, means for pivotally supporting said lever, means for automatically moving said lever in two directions to the common center of its different speed positions, said lever having a handle to one side of said pivot and an extension to the other side thereof, and said automatic means being mounted on a support independent of the support furnished by said pivot, and shiftable devices to one side of said pivot, engaged by said extension.

3. In a gear shift device, the combination of a plate with an H-slot, a controlling lever extending through said slot, means for automatically moving said lever from either end of the transverse portion of said slot to the common center of its different speed positions, said lever being movable at an angle to said two directions, and means connecting said lever and said automatic means whereby the latter may be shifted as a whole in said angular direction.

4. In a gear shift device, the combination of a support, a member pivoted thereon, a controlling lever pivoted to said pivoted member at a point above, and transversely with respect to, the pivot of the latter, to be movable at an angle to said member, said lever having a selecting extension located below the last named pivot, and gear shifting devices located to one side of said pivots and engaged by said extension.

5. In a gear shift device, the combination of a support, a member pivoted thereon, and a controlling lever pivoted to said member at a point above, and transversely with respect to, the pivot of the latter, to be movable at an angle to said member, and means mounted on said pivoted member to throw said lever from two sides to the common center of its different speed positions and movable by said lever as a whole.

6. In a gear shift device, the combination of a support, a member pivoted thereon, a controlling lever pivoted to said pivoted member at a point above, and transversely with respect to, the pivot of the latter, to be movable at an angle to said member, and spring means mounted directly on said pivoted member so as to partake of its movements, and acting on said lever in two directions to throw it to the common or neutral center of its different speed positions, said spring means being movable as a whole by said lever when said lever is moved at an angle to its said throw.

7. In a gear shift device, the combination of a controlling lever, a rigid plate having a plurality of connected guideways, means for mounting said lever for two kinds of movements, one kind from the center of the connecting way of said guideways to beyond either end thereof, and another kind from said connecting way to the outer ends of said guideways, and means bearing on said lever at opposite sides below said plate and constantly tending to press said lever, in any of its positions beyond said connecting way, against that side of each guideway which is toward said connecting way, so that when said lever is shifted to said connecting way it will be moved automatically to the center thereof, said centering means being movable as a whole by said lever when said lever is thrown to either speed position.

8. In a gear shift device, the combination of a supporting bracket, a link member, a pivot connecting the said link member and bracket, a controlling lever, a second pivot connecting the said lever and link member, and arranged transversely to aforesaid pivot, and a pair of spring fingers extending from said link member and acting on said lever to throw it to a given position with respect to said second pivot.

9. In a gear shift device, the combination of a supporting bracket, a link member, a pivot connecting the said link member and bracket, a controlling lever, a second pivot connecting the said lever and link member, and arranged transversely to aforesaid pivot, and a pair of spring fingers extending from said link member and acting on said lever, and a rigid guide plate for said lever having ways arranged in H-shape, said spring fingers acting respectively to hold said lever, when shifted on the first said pivot into one of the parallel ways, toward the other of said parallel ways, whereby said lever is adapted to be automatically moved on said second pivot by said springs to the center of the H.

10. In a gear shift device, the combination of a support, a controlling lever, a pivot joint connecting said lever with said support, and spring means mounted on a single part of said joint and acting on said lever in two directions to set it to the common center of its different speed positions, said spring means being movable as a whole away from said common center by an extended movement of said lever.

11. In a gear shift device, the combination of a quadrant, a control lever, means for pivotally supporting said lever for movement laterally and longitudinally of said quadrant, said lever having an extension beyond said pivotal support, and gear shifting means located in a different plane from said supporting means and operable by said extension, the pivot for the lateral movement being located above the pivot for the longitudinal movement, whereby the range of movement of said lever laterally of said quadrant is reduced and the greatest leverage for shifting the said gear-shifting means given through the longitudinal movement.

12. In a gear shift device in combination, a support, a lever, a universal joint between said lever and said support, and spring means mounted on a single member of said joint and acting on said lever to center it in neutral position from either side.

Signed at Detroit, this 26th day of January 1915.

JOHN F. DODGE.
HORACE E. DODGE.

Witnesses:
ALFRED H. KNIGHT,
GEO. W. MASON.